(12) United States Patent
Wensley et al.

(10) Patent No.: US 11,283,135 B2
(45) Date of Patent: *Mar. 22, 2022

(54) POROUS MEMBRANES FILLED WITH NANO-PARTICLES AND RELATED METHODS

(71) Applicant: Celgard, LLC, Charlotte, NC (US)

(72) Inventors: C. Glen Wensley, Rock Hill, SC (US); Lie Shi, Matthews, NC (US)

(73) Assignee: Celgard, LLC, Charlotte, NC (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/371,261

(22) Filed: Apr. 1, 2019

(65) Prior Publication Data

US 2019/0229319 A1 Jul. 25, 2019

Related U.S. Application Data

(60) Division of application No. 15/589,053, filed on May 8, 2017, now Pat. No. 10,249,862, which is a
(Continued)

(51) Int. Cl.
*H01M 50/411* (2021.01)
*H01M 10/0525* (2010.01)
(Continued)

(52) U.S. Cl.
CPC ..... *H01M 50/411* (2021.01); *H01M 10/0525* (2013.01); *H01M 50/403* (2021.01);
(Continued)

(58) Field of Classification Search
None
See application file for complete search history.

(56) References Cited

U.S. PATENT DOCUMENTS 6,432,586 B1 8/2002 Zhang
7,790,320 B2 9/2010 Arora et al.
(Continued)

FOREIGN PATENT DOCUMENTS

JP S63210144 A 8/1988
JP 07021078 B2 3/1995
(Continued)

OTHER PUBLICATIONS

Robert E. Kesting, "Stretched Semicrystalline Films," Synthetic Polymeric Membranes a Structural Perspective, 2 ed., John Wiley & Sons (New York), (p. 290-297), (1985).

*Primary Examiner* — Alix E Eggerding
(74) *Attorney, Agent, or Firm* — Hammer & Associates, P.C.

(57) ABSTRACT

A membrane includes a porous membrane or layer made of a polymeric material having a plurality of surface treated (or coated) particles (or ceramic particles) having an average particle size of less than about 1 micron dispersed therein. The polymeric material may be selected from the group consisting of polyolefins, polyamides, polyesters, co-polymers thereof, and combinations thereof. The particles may be selected from the group consisting of boehmite (AlOOH), $SiO_2$, $TiO_2$, $Al_2O_3$, $BaSO_4$, $CaCO_3$, BN, and combinations thereof, or the particles may be boehmite. The surface treatment (or coating) may be a molecule having a reactive end and a non-polar end. The particles may be pre-mixed in a low molecular weight wax before mixing with the polymeric material. The membrane may be used as a battery separator.

20 Claims, 5 Drawing Sheets

Related U.S. Application Data continuation of application No. 14/488,665, filed on Sep. 17, 2014, now Pat. No. 9,711,771.

(60) Provisional application No. 61/879,175, filed on Sep. 18, 2013.

(51) Int. Cl.
    *H01M 50/403* (2021.01)
    *H01M 50/431* (2021.01)
    *H01M 50/446* (2021.01)
    *H01M 50/449* (2021.01)
    *H01M 50/463* (2021.01)

(52) U.S. Cl.
    CPC ....... *H01M 50/431* (2021.01); *H01M 50/446* (2021.01); *H01M 50/449* (2021.01); *H01M 50/463* (2021.01)

(56) References Cited

U.S. PATENT DOCUMENTS

| | | | |
|---|---|---|---|
| 8,057,718 B2 | 11/2011 | Lee et al. | |
| 2008/0182933 A1 | 7/2008 | Shimizu et al. | |
| 2008/0206645 A1* | 8/2008 | Takahashi | H01M 10/4235 429/246 |
| 2010/0015530 A1 | 1/2010 | Katayama et al. | |
| 2010/0124701 A1 | 5/2010 | Naoi et al. | |
| 2011/0027658 A1* | 2/2011 | Kim | H01M 50/411 429/247 |
| 2011/0045339 A1 | 2/2011 | La et al. | |
| 2011/0052962 A1 | 3/2011 | Suzuki et al. | |
| 2011/0143185 A1* | 6/2011 | Nishikawa | H01M 50/449 429/145 |
| 2012/0283368 A1* | 11/2012 | Nagamatsu | C08K 9/04 524/130 |
| 2014/0094076 A1* | 4/2014 | Mrozinski | H01G 11/52 442/56 |
| 2014/0322587 A1* | 10/2014 | Lai | H01M 50/403 429/145 |
| 2015/0004462 A1* | 1/2015 | Huang | H01M 50/24 429/127 |

FOREIGN PATENT DOCUMENTS

| | | |
|---|---|---|
| JP | 2006307163 A | 11/2006 |
| JP | 2010108753 A | 5/2010 |

* cited by examiner

POROUS MEMBRANES FILLED WITH NANO-PARTICLES AND RELATED METHODS

RELATED APPLICATIONS

This application is a divisional application of co-pending U.S. application Ser. No. 15/589,053 filed May 8, 2017, now U.S. Pat. No. 10,249,862, which is a continuation of co-pending U.S. application Ser. No. 14/488,665 filed Sep. 17, 2014, now U.S. Pat. No. 9,711,771, which claimed priority to and the benefit of co-pending U.S. provisional patent application Ser. No. 61/879,175 filed Sep. 18, 2013, all of these applications are incorporated herein by reference.

FIELD OF THE INVENTION

The present invention is directed to membranes filled with particles, microporous membranes filled with surface treated (or coated) nano-particles, battery separators, related methods of manufacture and/or use, and/or the like.

BACKGROUND

Ceramic particle filled and ceramic particle coated battery separators for secondary lithium batteries are known, for example as described in respective U.S. Pat. Nos. 7,790,320 and 6,432,586, each hereby incorporated herein by reference. It is believed that these separators improve the safety of the secondary lithium battery by, for example, blocking dendrites, preventing shorting, enhancing the heat resistance and rigidity (strength and structure) of the polymeric (e.g., polyolefin) layer. Typically, the prior art particles consisted of rather large (some with particle size>1 micron) $SiO_2$, $TiO_2$, $Al_2O_3$, $BaSO_4$, $CaCO_3$, and the like particles. These ceramic particles, however, may be difficult to load and disperse into the polymeric material because of the difference in surface energy between the particles and the polymeric resin material. These problems become even greater as the particle size is moved from the micron range to the nanometer range because the surface energy of the particles increases even more.

Therefore, the problem is to load and disperse at least certain ceramic particles into a polymeric resin used to form a membrane, e.g., a battery separator.

SUMMARY OF THE INVENTION

In accordance with at least selected embodiments, the inventive membrane includes a porous membrane or layer made of a polymeric material having a plurality of surface treated (or coated) particles (or ceramic particles) having an average particle size of less than about 1 micron dispersed therein. The polymeric material may be selected from the group consisting of polyolefins, polyamides, polyesters, co-polymers thereof, and combinations thereof. The particles may be selected from the group consisting of Boehmite (AlOOH), $SiO_2$, $TiO_2$, $Al_2O_3$, $BaSO_4$, $CaCO_3$, BN, and combinations thereof. The surface treatment (or coating) on the particles or nanoparticles may be a molecule having a reactive end which can bind to the surface of the particle or nanoparticle and a non-polar end which can bind to the polymeric material. The surface coating preferably alters the surface energy of the particle to be similar to the surface energy of the polymeric material. With similar surface energies, the nanoparticle can be better mixed or blended with a polymeric material. In the case of a porous polymeric material used as a battery separator membrane, the inventive separator has been produced using an additional optional inventive step in the preparation of the ceramic nanoparticle and polymeric resin mix. Because the surface treated ceramic nanoparticles tend to clump and form agglomerates, an additional treatment is proposed to eliminate this problem. The surface treated ceramic particles are additionally preferably uniformly coated with a low molecular weight wax before mixing with the polymeric material. Blending of the wax-coated surface treated ceramic nanoparticles with the polymeric material successfully addresses problems with non-uniform mixing and dispersion of ceramic particles and polymeric materials.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
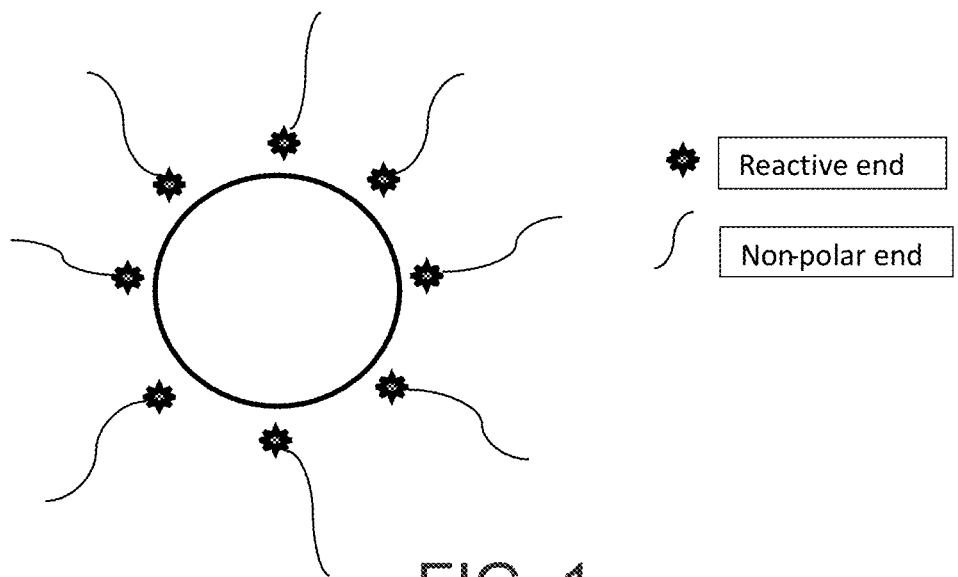
FIG. 1 is a schematic drawing of the surface coated ceramic particles with a reactive end and a non-polar end.

In accordance with at least certain embodiments, the invention is directed to membranes comprising a porous membrane or layer made of a polymeric material having a plurality of surface treated particles (or surface treated ceramic particles) having an average particle size of less than about 1 micron dispersed therein, or to membranes comprising a porous membrane or layer made of a polymeric material having a plurality of particles such as boehmite particles dispersed therein, battery separators, related methods of manufacture or use, and/or the like.

In accordance with at least selected embodiments, the invention is directed to membranes comprising a microporous membrane or layer made of a polymeric material having a plurality of surface treated particles (or surface treated ceramic particles) or wax-coated surface treated particles (or surface treated ceramic particles) having an average particle size of less than about 1 micron dispersed therein, or to membranes comprising a microporous membrane or layer made of a polymeric material having a plurality of boehmite particles dispersed therein.

The membrane or layer of a microporous membrane made of a polymeric material having a plurality of surface treated particles (or surface treated ceramic particles) or wax-coated surface treated particles (or surface treated ceramic particles) having an average particle size of less than about 1 micron dispersed therein or a microporous membrane made of a polymeric material having a plurality of boehmite particles dispersed therein may be one layer of a multiple layer membrane or separator. Preferably, the membrane or layer comprises a microporous membrane made of a polymeric material having a plurality of boehmite particles having an average particle size of less than about 1 micron dispersed therein.

Membrane, as used herein, preferably refers to a solid or continuous polymeric sheet or film with a plurality of pores or micropores therethrough. The membrane may also be a nonwoven structure (i.e., made of a plurality of fibers (filaments or staple); and in some embodiments, the membrane is one layer of a multilayer composite or product that may include one or more porous films, one or more nonwoven structures (i.e., made of a plurality of fibers (filament or staple)), one or more coatings, one or more ceramic coatings, and/or other layers.

The polymeric material may be any polymeric material. The polymeric material may be a thermoplastic polymer. In one embodiment, the polymeric material may be selected from the group of polyolefins, polyamides, polyesters, co-polymers thereof, and combinations thereof. In another possibly preferred embodiment, the polyolefins may be selected from the group of polyethylene, polypropylene, polybutylene, polymethylpentene, co-polymers thereof, and combinations thereof.

In one embodiment, the polymeric material may comprise up to about 99.9 wt % of the total weight of the membrane or layer. In another embodiment, the polymeric material may comprise 75-97.5 wt % of the total weight of the membrane or layer. In still another embodiment, the polymeric material may comprise 80-95 wt % of the total weight of the membrane or layer. In yet another embodiment, the polymeric material may comprise 87.5-92.5 wt % of the total weight of the membrane or layer. In another embodiment, the polymeric material may comprise 90 wt % of the total weight of the membrane or layer.

The particles may be loaded in the polymeric material at any level. In one embodiment, the particles may comprise about 0.1-30% by weight of the membrane (polymeric material and the particles), or about 0.1-10 wt %, or less than about 10 wt %, or 2-10 wt % (or any sub set thereof). In yet another embodiment, the particles may comprise 1-10 wt % of total weight of the membrane, or 2-8 wt % of total weight of the membrane, or 3-5 wt % of total weight of the membrane, or 4 wt % of total weight of the membrane (or any sub set thereof).

Prior to loading the particles or nanoparticles into the polymeric materials or mixing and blending the particles or nanoparticles with the polymeric material, the surface of the particles or nanoparticles are first preferably treated with a molecule specifically designed to have a reactive functional end group and a non-polar functional end group. The reactive end of the molecule can bind to the surface of the particle or nanoparticle and the non-polar end of the molecule can bind to the polymeric material or materials.

Figure 2:
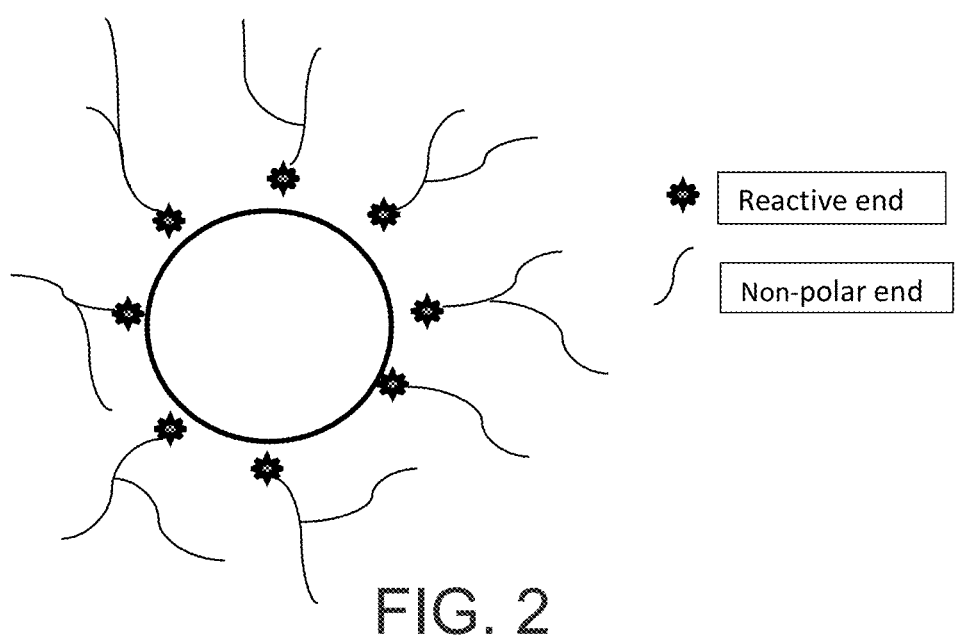
FIG. 2 depicts a schematic drawing of the surface coated ceramic particles with branched hydrocarbon tails wrapped around the perimeter of a particle.

FIG. 1 depicts an exemplary surface treated particle or nanoparticle where the 'star-shaped' symbol represents the reactive functional end group which, in the case of Boehmite, is an '—OH' group. The non-polar functional end group situated on the other end of the molecule is a hydrocarbon which can have up to 20 carbon atoms. In addition, the hydrocarbon section can contain one or double bonds which are capable of undergoing a reaction to attach one or more addition hydrocarbon functional groups as a side chain. The length of these hydrocarbon portions of the molecule can be of sufficient length that the hydrocarbon non-polar functional end groups can wrap around the outside of the ceramic particle effectively increasing the volume occupied by the particle as depicted in FIG. 2. The hydrocarbon tails surrounding the ceramic particle have a similar surface energy to that of a polymeric material. In one embodiment, the non-polar end may be aliphatic hydrocarbon where the number of carbons is <20 and contains a double bond but, any end group capable of intermingling (or interacting) with the polymeric material or wrapping around the particle may be used. For example, in one embodiment, the aliphatic hydrocarbon may have 20 or less carbons (≤20 carbons), in another, in the range of 5-20 hydrocarbons, and another 10-20 hydrocarbons, and another 12-18 hydrocarbons (and any sub set therein). The non-polar end may be a single chain or branched. While not wishing to be bound to any specific theory, it is believed that the surface treatment molecule uses the reactive end to bind to the particle, while the non-polar ends wrap themselves around the particle. The surface energy of the particle is now similar to the polymeric material which facilitates the dispersion of the particles into the polymeric material of similar surface energy. The coated or treated particle may be further coated (over coated) with a wax or polymer.

Preferably, the surface coating on the particle alters the surface energy of the particle to be similar to the surface energy of the polymeric material. With similar surface energies, the nanoparticle can be better mixed, dispersed or blended with one or more polymeric materials.

In the case of a polymeric material used as a battery separator membrane, the inventive separator has been produced using an additional inventive step in the preparation of the ceramic nanoparticle and polymeric resin mix. Because the surface treated ceramic nanoparticles tend to clump and form agglomerates, a second surface treatment is proposed to address this problem. For example, the surface treated ceramic particles are uniformly coated with a polyolefin (polypropylene or polyethylene) wax having a low molecular weight approximately in the range of 800-5,000. The low molecular weight wax has a melt temperature of about 130 to 160 deg C. When the polymeric material is, for example, an isotactic polypropylene, the wax can also be an isotactic polypropylene. The wax coating or treatment of the surface treated particles lowers the surface energy of the particle. For example, the surface energy of a surface untreated Boehmite particle is on the order of 60-80 erg/cm$^2$ while the surface energy of PP is 32+/−2 erg/cm$^2$. The wax coating may lower the surface energy of the particle to generally correspond to the surface energy of the polymeric material which facilitates the uniform mixing of the particles into the polymeric material.

Figure 3:
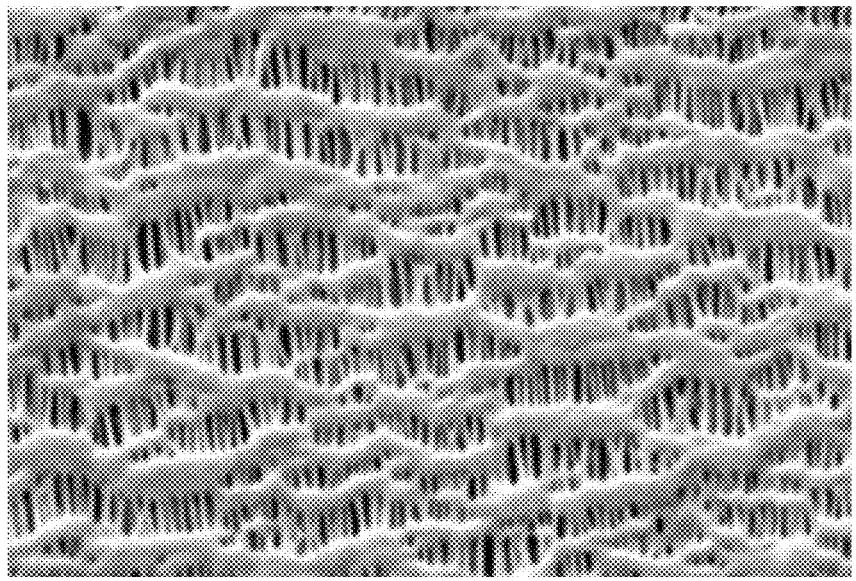
FIG. 3 is a scanning electron microscopy (SEM) image (surface) of a typical (prior art) microporous membrane made a dry stretch manufacturing process, such as the Celgard dry process.
Figure 4:
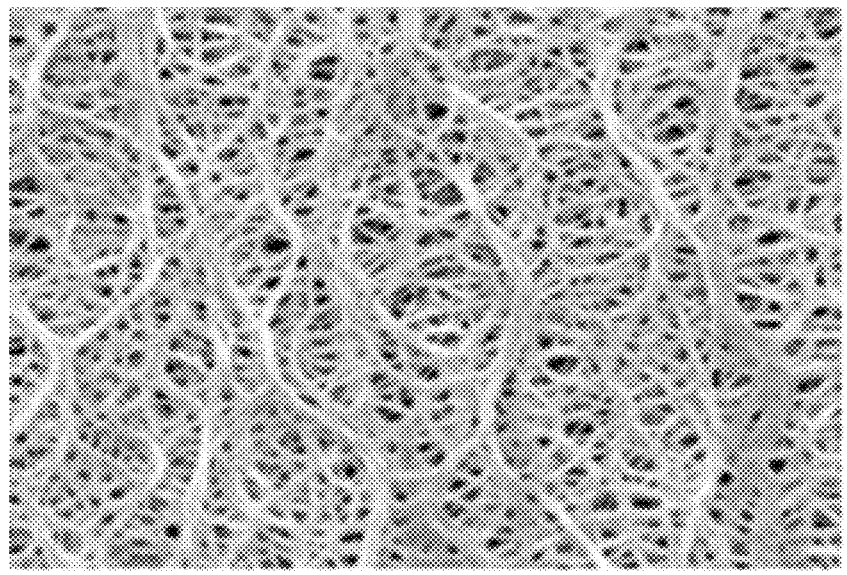
FIG. 4 is a SEM image (surface) of a typical (prior art) microporous membrane made by a wet stretch process.
Figure 7:
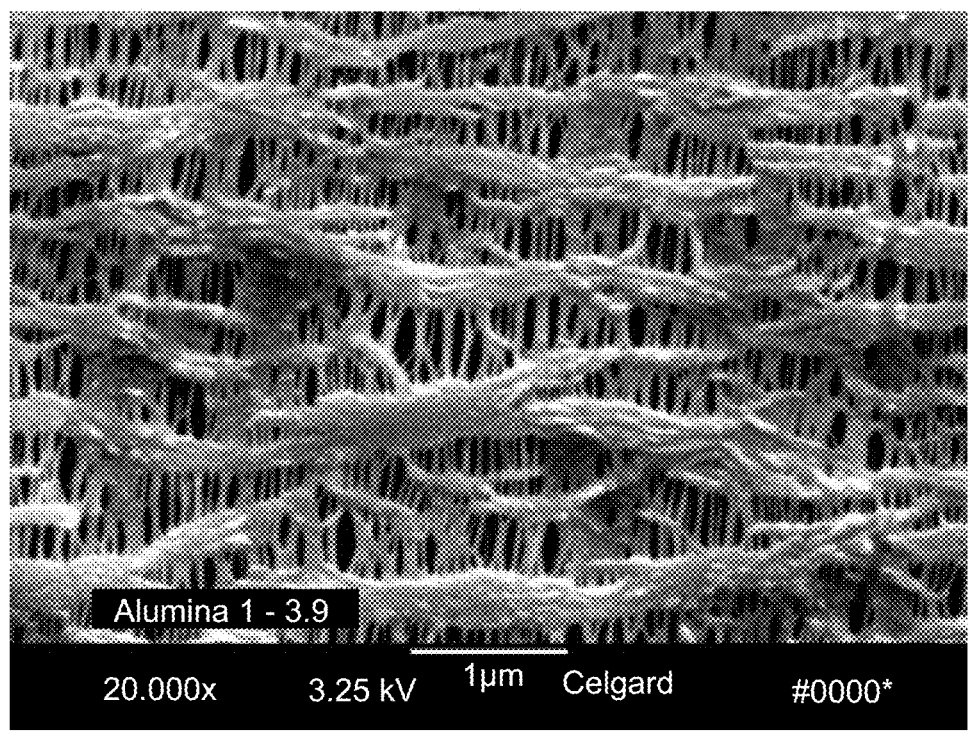
FIG. 7 is a SEM image of one example of the surface of an inventive membrane.
Figure 8:
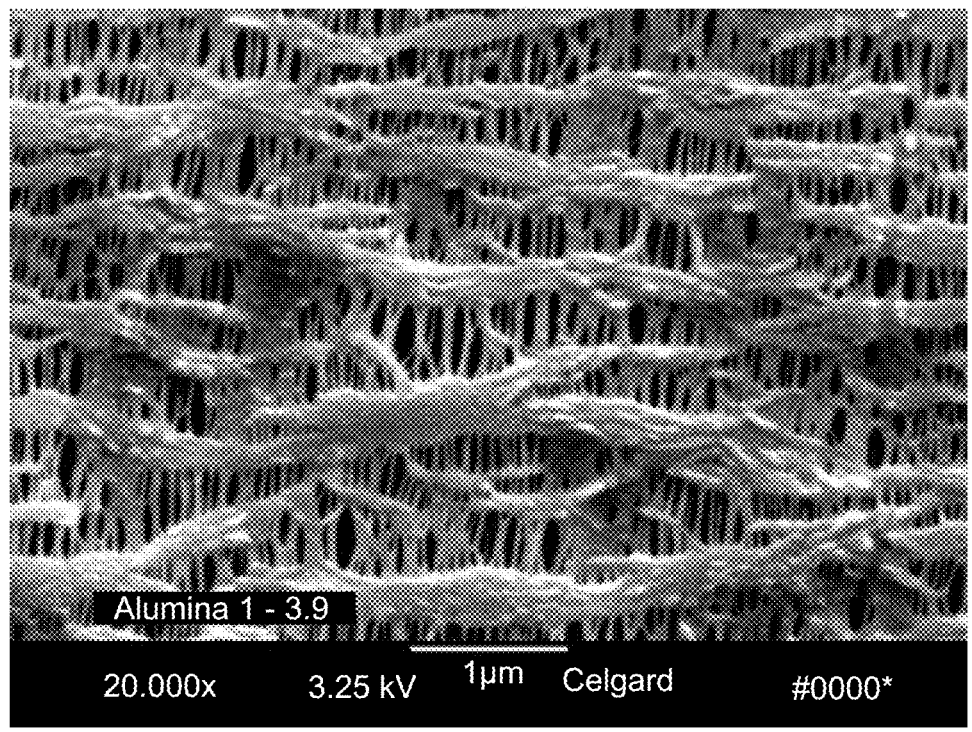
FIG. 8 is a SEM image of another example of the surface of the inventive membrane.
Figure 9:
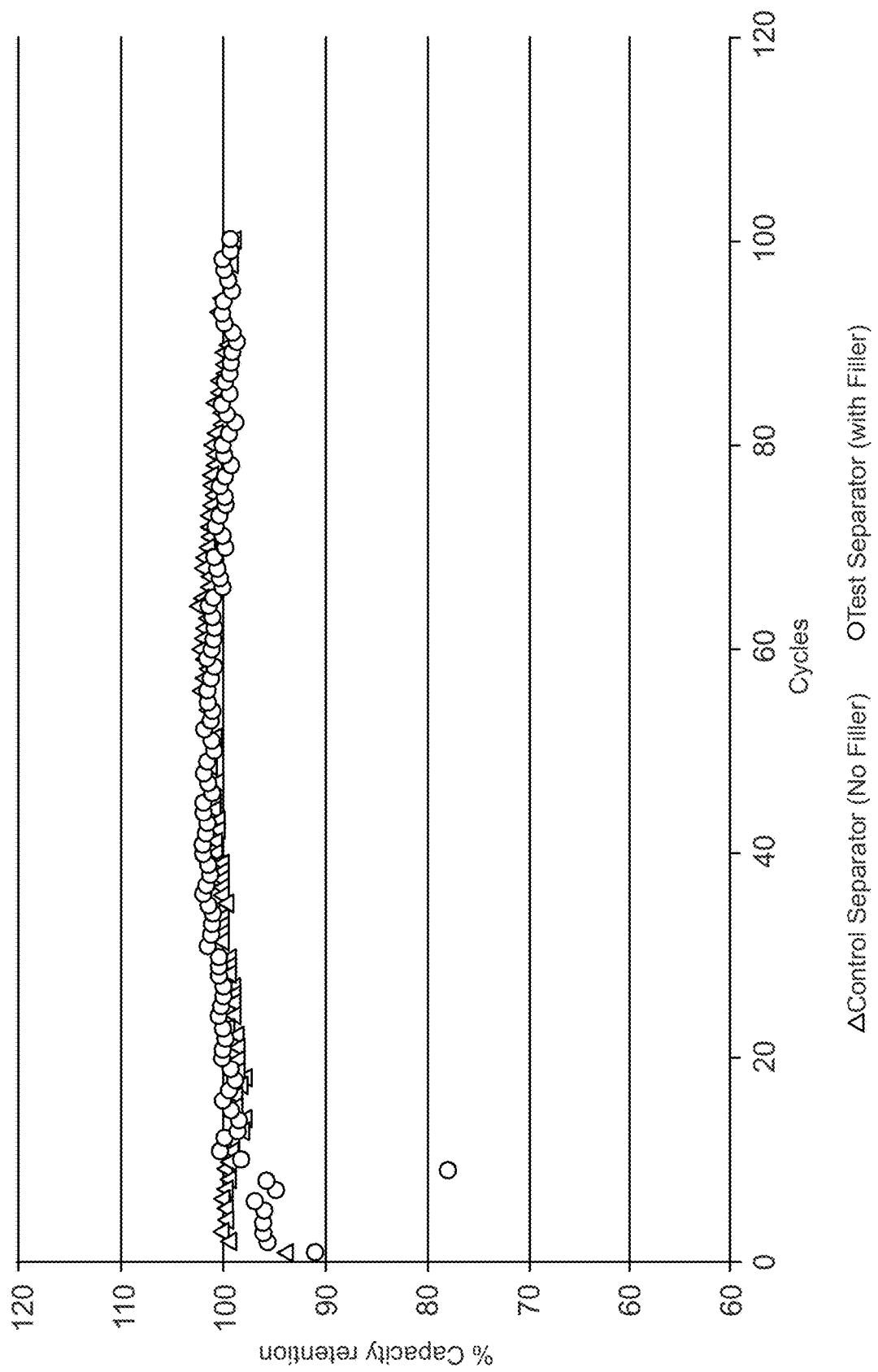
FIG. 9 is a graph comparing the cell cycle results of the instant filled membrane invention to a conventional microporous membrane.

The wax may be applied in liquid state and dried to produce the wax-coated surface treated ceramic particles or nanoparticles. The application of the wax coating is as an effective dispersion method to uniformly blend the nanoparticle with the polymeric material. Its presence facilitates uniform dispersion of the nanoparticle into the polymer. Blending of the wax-coated surface treated ceramic nanoparticles with the polymeric material successfully addresses problems with non-uniform mixing of ceramic particles and polymeric materials. FIG. 7 shows an SEM micrograph of the surface of an exemplary inventive separator membrane containing wax-coated surface treated nanoparticles. The particles are so uniformly mixed, that they are difficult to see in the lamellae and pores of the microporous membrane but on close observation of the micrograph the uniform dispersion can be seen. FIG. 8 also shows an SEM micrograph of the inventive separator membrane with excellent mixing of the wax coated surface treated particles into the polymeric separator membrane. FIG. 3 shows a microporous membrane made by a comparative dry process but without any nanoparticles for comparison.

The particles may be loaded in the polymeric material at any level. In one embodiment, the particles may comprises about 0.1-30% by weight of the polymeric material and the particles, or about 0.1-10 wt %, or less than about 10 wt %, or 2-10 wt % (or any sub set thereof). In yet another embodiment, the particles may comprise 1-10 wt % of total weight of the membrane, or 2-8 wt % of total weight of the membrane, or 3-5 wt % of total weight of the membrane, or 4 wt % of total weight of the membrane (or any sub set thereof).

The particles may be any particle, or ceramic particle. In one embodiment, the ceramic particles may be selected from the group consisting of boehmite (AlOOH), $SiO_2$, $TiO_2$, $Al_2O_3$, $BaSO_4$, $CaCO_3$, BN, and combinations thereof. In another embodiment, the particles may be boehmite. Boehmite particles are commercially available from Sasol of Johannesburg, South Africa.

In one embodiment, the particles have a size in the range of less than 1 micron. In other embodiments, the particle size may range as less than about 500 nanometers, or less than about 300 nanometers, or less than about 200 nanometers, or in the range of about 20 to about 200 nanometers (and any range subsumed therein).

While not wishing to be bound to any specific theory, it is believed that the inclusion of the nanoparticles effects the growth of the crystalline lamellae of the polymeric material. It has been observed that inclusion of up to 10% by weight of the nanoparticles alters crystal growth, so that during pore formation, the pores are generally about 15% smaller than normally observed.

The surface treating (or coating) molecule may be selected from the group consisting of fatty acids, fatty acid enol esters, fatty alcohols, fatty amines, fatty esters, fatty nitriles, and combinations thereof. One such material is available from Lubrizol Corporation of Wickcliffe, Ohio.

The wax may be any low molecular weight polymer or oligomer. The wax should be chosen to be compatible with the polymeric material (e.g., the wax should be miscible or at least partially miscible with the polymeric material). For example, if the polymeric material is a polyolefin, the wax may be a like (but necessarily the same) polyolefin. Low molecular weight refers to a molecular weight less than the polymeric material. The molecular weight of the wax may be expressed as a molecular weight or viscosity. The molecular weight may be in the range of 800-5000, or in the range of 1000-5000, or in the range of 2000-5000. The viscosity may be less than or equal to 10 centipoise in a temperature range of 150-180° C.

The pre-mixture of wax and particles may have any mixing ratio. In one embodiment, the wax is in excess of the particles. In another embodiment, the particles may comprise 30-50 wt % of the pre-mixture, and the wax may comprise 50-70 wt % of the pre-mixture. In another embodiment, the particle:wax ratio may be 2:3. In one embodiment, the wax may comprise 1.5-15 wt % of the total weight of the membrane or layer; or 3-12 wt % of the total weight of the membrane or layer; or 4.5-7.5 wt % of the total weight of the membrane or layer; or 6 wt % of the total weight of the membrane or layer (or any sub set therein).

The foregoing membrane may be used in any application. In one embodiment, the membrane is a porous or microporous membrane used as a battery separator. The membrane, in this application, may be one or more of the layers of a multi-layered separator or the sole layer of the separator.

The foregoing membrane when used as a battery separator (or at least one layer or ply of a separator) may be incorporated into any battery. A battery may include a negative electrode, a positive electrode, the separator is sandwiched between the negative and positive electrodes, and an electrolyte in communications between the negative and positive electrodes. The battery may be a primary or secondary battery. The secondary battery may be a lithium battery or a lead-acid battery.

The particles may be incorporated in the polymeric material and subsequently formed into the membrane in any manner. In one embodiment, the dried surface treated ceramic particles are mixed with the wax thereby forming the pre-mixture; the pre-mixture is mixed with the polymeric material thereby forming a second mixture; and the second mixture is formed into a microporous membrane. The first (pre) mixing step may include heating, so that the first mixture is a fluid (e.g. liquid).

The membrane may be formed (e.g., made microporous) in any manner. In one embodiment, the membrane may be formed by the steps of: extruding the second mixture into a sheet or tube, annealing the sheet or tube, and stretching the annealed sheet or tube. In another embodiment, the membrane may be formed by the steps of: extruding the second mixture into a sheet, calendering the sheet, and extracting a pore forming material from the calendered sheet.

There are multiple benefits that may be observed when the foregoing membrane is incorporated into a battery (e.g., a secondary lithium battery). A few examples are: 1) that the surface energy of the entire membrane increases substantially, this leads to a much faster absorption of the typical lithium ion electrolyte; 2) the effective surface coefficient of friction tends to be reduced because the presence of the particles increases the surface roughness slightly; and/or 3) the presence of the chemically active ceramic particle (e.g., surface treated boehmite) will scavenge deleterious hydrofluoric acid (HF) within a lithium ion battery which in turn will promote a longer cycle life for the battery. These three examples of changed or improved properties may be observed when the loading of the nanoparticles is less than 10 wt % and perhaps as low as 2 wt %. If the loading is much greater than 10 wt %, then the creation of the pore structure may become more difficult and, at some point, the manufacture of a membrane with>30% porosity possibly cannot be accomplished. The true upper limit depends upon the properties of the separator that are acceptable. In addition, it is believed that the presence of the nanoparticles changes the normal crystal growth behavior in lamellae of the precursor membrane. The particles change the completeness of the crystal growth. The overall conclusion is that addition of the nano-particles up to 10 wt% causes the crystal size and therefore the pore size to be about 15% smaller than standard.

EXAMPLE

A master batch, consisting of surface treated nanoparticles (surface treated boehmite which were 20-200 nm in average diameter)—40% by weight of the master batch and low molecular weight (800-5000 m.w.) polypropylene wax with a melt temperature of 160° C.—60% by weight of the master batch, was prepared.

The master batch was melt extruded at 9.5% by weight with an isotactic polypropylene using a standard annular die (i.e., a standard blown film process, as is well known in the art) to form a 20 micron (thick) precursor.

Figure 5:
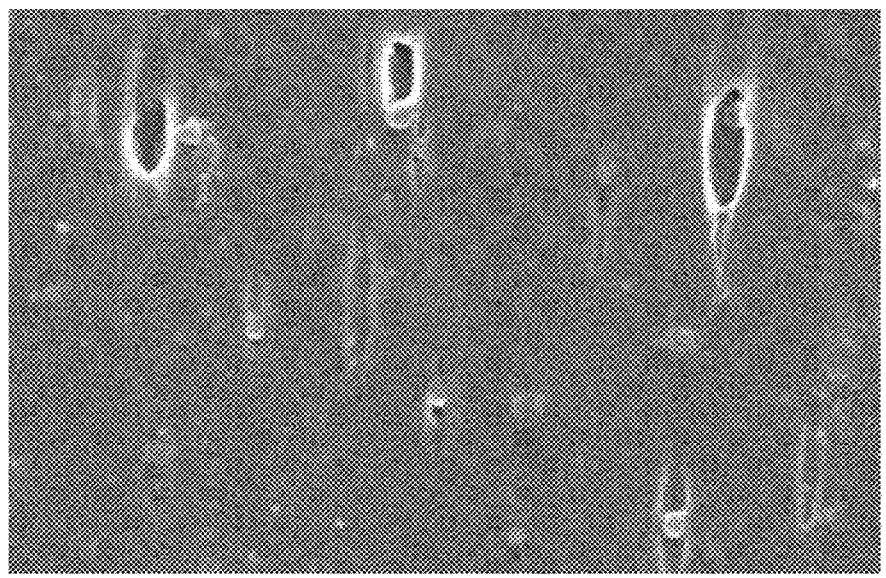
FIG. 5 is a SEM image (surface) of a porous membrane made by a particle stretch method (prior art).
Figure 6:
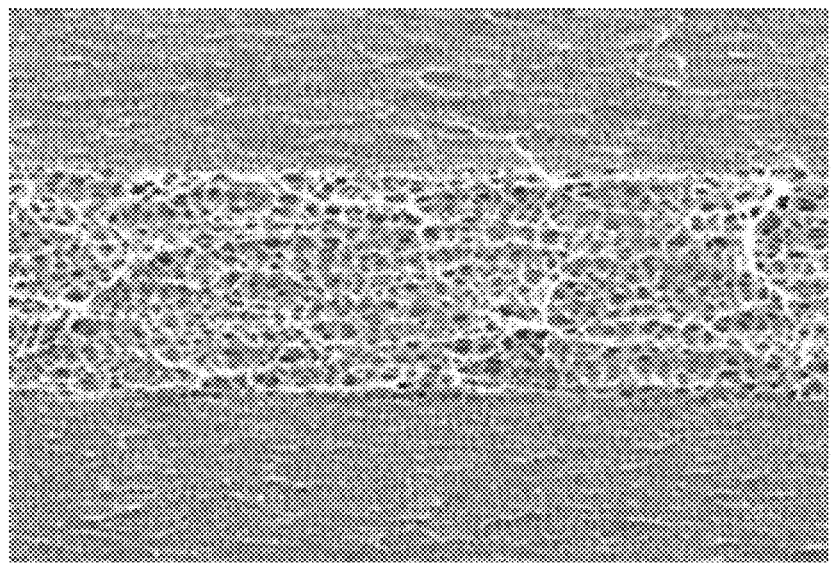
FIG. 6 is a SEM image (cross-section) of the edge of a multilayered membrane, upper and lower layers similar or the same polymer and the intermediate layer is a different polymer (prior art).

The precursor was made microporous in a conventional dry-stretch fashion (see, for example, Kesting, R. E., *Synthetic Polymer Membranes, A Structural Perspective*, $2^{nd}$, Edition, Wiley-Interscience, NY, N.Y., 1985, pp 290-297, incorporated herein by reference). The stretching conditions include: 20% cold stretch (room temperature), and 120% hot stretch (125° C.). The resulting membrane had: a thickness of 22.1 microns; a Gurley of 26.1 sec (ASTM method) and 650 sec (JIS method); and a porosity of 31.1%. A significant amount of Boehmite nanoparticles were well mixed into the PP resins without any evidence of interface failure during stretching. This is due to the proper particle surface coating and/or treatment. FIG. 5 shows interface failure during stretching of prior art particle stretching with large scale particles.

The foregoing membrane (filled with surface treated nanoparticles) was formed into a conventional coin cell and cycled through 100 cycles. A comparison with a like coin cell using a unfilled CELGARD 2500 membrane (Gurley 200 sec—JIS method) is shown in FIG. 7. The comparison indicates that there is no discernible difference between the performance of these particular cells.

The surface treated Boehmite nanoparticle particle/polymer blend of the present invention can produce a battery separator membrane that can act as a scavenger for Hydrofluoric acid in a battery effectively increasing cycle life of the battery at a much lower cost than coating a battery separator membrane with an alumina containing coating. It was determined that 10-15% by weight surface treated Boehmite nanoparticles blended into a film can also produce an excellent HF scavenging effect.

In accordance with at least selected embodiments, objects or aspects of the present invention, a membrane includes a porous membrane or layer made of a polymeric material or materials having a plurality of surface treated (or coated) particles (or ceramic particles) having an average particle size of less than about 1 micron dispersed therein (other additives, agents or materials may be added to the mix or mixture). The polymeric material may be selected from the group consisting of polyolefins, polyamides, polyesters, co-polymers thereof, and combinations thereof. The particles may be selected from the group consisting of boehmite (AlOOH), $SiO_2$, $TiO_2$, $Al_2O_3$, $BaSO_4$, $CaCO_3$, BN, and combinations thereof, or the particles may be boehmite. The surface treatment (or coating) may be a molecule having a reactive end and a non-polar end. The particles may be pre-mixed in a low molecular weight wax before mixing with the polymeric material. The membrane may be used as at least one layer of a battery separator.

The present invention may be embodied in other forms without departing from the spirit and the essential attributes thereof, and, accordingly, reference should be made to the appended claims, rather than to the foregoing specification, as indicated the scope of the invention.

We claim:

1. A membrane comprising:
    a porous or microporous membrane or layer made of a polymeric material having a plurality of surface treated and then wax-coated particles dispersed therein, wherein the wax has a molecular weight of from 800 to 5000.

2. The membrane of claim 1, wherein the surface-treated and then wax-coated particles have an average particle size less than about 1 micron.

3. The membrane of claim 2 wherein said average particle size is less than about 500 nanometers.

4. The membrane of claim 1, wherein the wax is a polyolefin wax.

5. The membrane of claim 1, wherein the polyolefin wax is polyethylene, polypropylene, or a combination of polyethylene and polypropylene.

6. The membrane of claim 1 wherein said polymeric material being selected from the group consisting of polyolefins, polyamides, polyesters, co-polymers thereof, and combinations thereof.

7. The membrane of claim 6, wherein said polyolefins is selected from the group consisting of polyethylene, polypropylene, polybutylene, polymethylpentene, co-polymers thereof, and combinations thereof.

8. The membrane of claim 1 wherein said plurality of surface-treated and then wax-coated particles comprises 0.1-30% by weight of said polymeric material.

9. The membrane of claim 1 wherein said surface-treated and then wax-coated particles comprise ceramic particles selected from the group consisting of boehmite (AlOOH), $SiO_2$, $TiO_2$, $Al_2O_3$, $BaSO_4$, $CaCO_3$, BN, and combinations thereof with a surface treatment or coating.

10. The membrane of claim 1 wherein said surface treatment comprises a molecule having a reactive end and a non-polar end.

11. A battery separator comprising the membrane of claim 1.

12. The battery separator of claim 11 wherein said membrane is a layer of a multi-layered separator.

13. A battery comprising: a negative electrode, a positive electrode, a separator sandwiched between said negative electrode and said positive electrode, an electrolyte in communication between said negative electrode and said positive electrode, and said separator including a membrane comprising: a porous membrane or layer made of a polymeric material having a plurality of surface-treated and then wax-coated particles dispersed therein, wherein the wax has a molecular weight of from 800 to 5000.

14. The battery of claim 13, wherein the surface-treated and then wax-coated particles have an average particle size of less than about 1 micron.

15. The battery of claim 13, wherein the surface-treated and then wax-coated particles have an average particle size less than about 500 nm.

16. The battery of claim 13, wherein the wax is a polyolefin wax.

17. The battery of claim 16, wherein the polyolefin wax is polyethylene, polypropylene, or a combination of polyethylene and polypropylene.

18. A porous or microporous sheet or film membrane comprising:
    a porous or microporous membrane or layer made of a polymeric material having a plurality of surface treated and then wax-coated particles dispersed therein, wherein the wax has a molecular weight of from 800 to 5000.

19. A porous or microporous tube membrane comprising:
    a porous or microporous membrane or layer made of a polymeric material having a plurality of surface treated and then wax-coated particles dispersed therein, wherein the wax has a molecular weight of from 800 to 5000.

20. A porous or microporous nonwoven layer comprising:
a plurality of fibers made of a polymeric material having a plurality of surface treated and then wax-coated particles dispersed therein, wherein the wax has a molecular weight of from 800 to 5000.

\* \* \* \* \*